United States Patent
Venkatesh et al.

(10) Patent No.: US 9,069,472 B2
(45) Date of Patent: Jun. 30, 2015

(54) METHOD FOR DISPERSING AND COLLATING I/O'S FROM VIRTUAL MACHINES FOR PARALLELIZATION OF I/O ACCESS AND REDUNDANCY OF STORING VIRTUAL MACHINE DATA

(71) Applicants: Chetan Venkatesh, San Mateo, CA (US); Kartikeya Iyer, Mountain View, CA (US)

(72) Inventors: Chetan Venkatesh, San Mateo, CA (US); Kartikeya Iyer, Mountain View, CA (US)

(73) Assignee: Atlantis Computing, Inc., Mountain View, CA (US)

( * ) Notice: Subject to any disclaimer, the term of this patent is extended or adjusted under 35 U.S.C. 154(b) by 69 days.

(21) Appl. No.: 13/725,942

(22) Filed: Dec. 21, 2012

(65) Prior Publication Data
US 2014/0181366 A1    Jun. 26, 2014

(51) Int. Cl.
*G06F 12/08* (2006.01)
*G06F 3/06* (2006.01)
*G06F 9/455* (2006.01)

(52) U.S. Cl.
CPC .............. *G06F 3/0614* (2013.01); *G06F 3/065* (2013.01); *G06F 3/0689* (2013.01); *G06F 9/455* (2013.01); *G06F 3/0613* (2013.01); *G06F 12/08* (2013.01); *G06F 9/45558* (2013.01); *G06F 2009/45579* (2013.01); *G06F 2009/45583* (2013.01)

(58) Field of Classification Search
None
See application file for complete search history.

(56) References Cited

U.S. PATENT DOCUMENTS

| | | |
|---|---|---|
| 4,603,380 A | 7/1986 | Easton et al. |
| 6,675,214 B2 | 1/2004 | Stewart et al. |
| 6,807,619 B1 | 10/2004 | Ezra et al. |
| 6,915,302 B1 | 7/2005 | Christofferson et al. |
| 7,269,608 B2 | 9/2007 | Wong et al. |
| 7,356,651 B2 | 4/2008 | Liu et al. |
| 7,571,288 B2 | 8/2009 | Pudipeddi et al. |
| 7,908,436 B1 | 3/2011 | Srinivasan et al. |
| 8,046,446 B1 | 10/2011 | Karr et al. |
| 8,117,464 B1 | 2/2012 | Kogelnik |
| 8,312,471 B2 | 11/2012 | Davis |
| 8,495,288 B2 | 7/2013 | Hosoya et al. |
| 8,732,401 B2 | 5/2014 | Venkatesh et al. |
| 2002/0124137 A1 | 9/2002 | Ulrich et al. |
| 2003/0145045 A1 | 7/2003 | Pellegrino et al. |
| 2003/0188045 A1 | 10/2003 | Jacobson |
| 2004/0111443 A1 | 6/2004 | Wong et al. |
| 2004/0128470 A1 | 7/2004 | Hetzler et al. |
| 2005/0038850 A1 | 2/2005 | Oe et al. |
| 2005/0108440 A1* | 5/2005 | Baumberger et al. ............. 710/1 |
| 2005/0114595 A1 | 5/2005 | Karr et al. |
| 2005/0131900 A1 | 6/2005 | Palliyll et al. |
| 2006/0112251 A1 | 5/2006 | Karr et al. |
| 2006/0272015 A1 | 11/2006 | Frank et al. |
| 2007/0005935 A1 | 1/2007 | Khosravi et al. |
| 2007/0192534 A1 | 8/2007 | Hwang et al. |
| 2007/0248029 A1 | 10/2007 | Merkey et al. |

(Continued)

OTHER PUBLICATIONS

U.S. Appl. No. 13/269,525, Office Action, Mailed Jul. 26, 2013, 6 pages.

(Continued)

*Primary Examiner* — Gary Portka
(74) *Attorney, Agent, or Firm* — Blakely, Sokoloff, Taylor & Zafman LLP

(57) ABSTRACT

Methods and systems to disperse and collate I/O from virtual machines (VMs) among a plurality of near line controllers for parallelization of I/O's (parallel reads and parallel writes) and for providing redundancy for stored VM data is disclosed.

28 Claims, 12 Drawing Sheets

(56) References Cited

U.S. PATENT DOCUMENTS

| | | |
|---|---|---|
| 2007/0266037 A1 | 11/2007 | Terry et al. |
| 2008/0183986 A1 | 7/2008 | Yehia et al. |
| 2009/0063528 A1 | 3/2009 | Yueh |
| 2009/0063795 A1 | 3/2009 | Yueh |
| 2009/0089337 A1 | 4/2009 | Perlin et al. |
| 2009/0254507 A1 | 10/2009 | Hosoya et al. |
| 2009/0319772 A1 | 12/2009 | Singh et al. |
| 2010/0031000 A1 | 2/2010 | Flynn et al. |
| 2010/0064166 A1 | 3/2010 | Dubnicki et al. |
| 2010/0070725 A1 | 3/2010 | Prahlad et al. |
| 2010/0180153 A1 | 7/2010 | Jernigan, IV et al. |
| 2010/0181119 A1 | 7/2010 | Saigh et al. |
| 2010/0188273 A1 | 7/2010 | He et al. |
| 2010/0274772 A1 | 10/2010 | Samuels |
| 2010/0306444 A1 | 12/2010 | Shirley et al. |
| 2011/0035620 A1 | 2/2011 | Elyashev |
| 2011/0055471 A1 | 3/2011 | Thatcher et al. |
| 2011/0071989 A1 | 3/2011 | Wilson et al. |
| 2011/0082836 A1 | 4/2011 | Wang et al. |
| 2011/0131390 A1 | 6/2011 | Srinivasan et al. |
| 2011/0145243 A1 | 6/2011 | Yudenfriend |
| 2011/0167045 A1 | 7/2011 | Okamoto |
| 2011/0196900 A1 | 8/2011 | Drobychev et al. |
| 2011/0265083 A1 | 10/2011 | Davis |
| 2011/0276781 A1 | 11/2011 | Sengupta et al. |
| 2011/0295914 A1 | 12/2011 | Mori |
| 2012/0016845 A1 | 1/2012 | Bates |
| 2012/0054445 A1 | 3/2012 | Swart et al. |
| 2012/0137054 A1 | 5/2012 | Sadri et al. |
| 2012/0159115 A1* | 6/2012 | Cha et al. ................. 711/203 |
| 2012/0254131 A1 | 10/2012 | Al Kiswany et al. |
| 2013/0013865 A1 | 1/2013 | Venkatesh et al. |
| 2013/0117494 A1* | 5/2013 | Hughes et al. ................. 711/6 |
| 2013/0124523 A1 | 5/2013 | Rogers et al. |
| 2013/0166831 A1 | 6/2013 | Atkisson et al. |
| 2013/0238876 A1 | 9/2013 | Fiske et al. |
| 2013/0282627 A1 | 10/2013 | Faddoul et al. |
| 2013/0283004 A1* | 10/2013 | Devine et al. ................. 711/206 |

OTHER PUBLICATIONS

U.S. Appl. No. 13/269,525, Final Office Action, Mailed Jan. 2, 2014, 9 pages.
U.S. Appl. No. 13/269,525, Office Action, Mailed May 12, 2014, 8 pages.
U.S. Appl. No. 13/269,503, Office Action, Mailed Nov. 8, 2013, 6 pages.
U.S. Appl. No. 13/269,503, Notice of Allowance, Mailed Feb. 25, 2014, 8 pages.
PCT/US2013/076704, International Search Report and Written Opinion, Mailed Aug. 22, 2014.
PCT/US2013/076683, International Search Report and Written Opinion, Mailed May 23, 2014.
U.S. Appl. No. 13/725,939, Office Action, Mailed Jan. 28, 2015, 17 pages.

\* cited by examiner

METHOD FOR DISPERSING AND COLLATING I/O'S FROM VIRTUAL MACHINES FOR PARALLELIZATION OF I/O ACCESS AND REDUNDANCY OF STORING VIRTUAL MACHINE DATA

FIELD OF THE APPLICATION

Embodiments of the application relate generally to software, data storage, and virtualized computing and processing resources. More specifically, systems, methods, and apparatuses are described for aggregating nodes to a virtual aggregate for a virtualized desktop environment.

BACKGROUND OF THE APPLICATION

Conventional solutions for virtualization technology provide numerous capabilities to efficiently deliver applications and desktops by packaging them as virtual machines. Virtualization is a technology that provides a software based abstraction to a physical hardware based computer. The abstraction layer decouples the physical hardware components—CPU, memory, and disk from the Operating System (OS) and thus allows many instances of an OS to be run side-by-side as virtual machines (VMs) in complete isolation to one another. The OS within each virtual machine sees a complete, consistent and normalized set of hardware regardless of the actual physical hardware underneath the software based abstraction. Virtual machines are encapsulated as files (also referred to as images) making it possible to save, replay, edit, copy, cut, and paste the virtual machine like any other file on a file-system. This ability is fundamental to enabling better manageability and more flexible and quick administration compared to physical virtual machines.

Those benefits notwithstanding, conventional VMs suffer from several performance related weaknesses that arise out of the way the VM interfaces with the storage sub-system(s) that stores the VM images or files. The storage sub-system(s) can include one or more server racks with each rack including networking gear (e.g., routers, switches, etc.), server computers, and locally attached storage (e.g., a hard disk drive—HDD) for each server. Furthermore, the storage sub-system(s) can be in communication with a storage network such as a Storage Area Network (SAN) or Network Attached Storage (NAS). The servicing of I/O from the VMs through those storage sub-system(s) introduces latencies (e.g., due to write operations) and redundancies that can create I/O bottlenecks and can reduce system performance. The aforementioned performance weaknesses include but are not limited to the following examples.

First, every read operation or write operation performed by every single VM (and there can be hundreds if not thousands of VMs performing such operations concurrently) is serviced in a queue by the storage system. This creates a single point of contention that results in below-par performance.

Second, there are numerous latencies that develop as input/output (IO) is queued at various points in an IO stack from a VM hypervisor to the storage system. Examples of latencies include but are not limited to: (a) when an application residing inside a Guest OS issues an IO, that IO gets queued to the Guest OS's Virtual Adapter driver; (b) the Virtual Adapter driver then passes the IO to a LSI Logic/BusLogic emulator; (c) the LSI Logic/BusLogic emulator queues the IO to a VMkernel's Virtual SCSI layer, and depending on the configuration, IOs are passed directly to the SCSI layer or are passed thru a Virtual Machine File System (VMFS) file system before the IO gets to the SCSI layer; (d) regardless of the path followed in (c) above, ultimately all IOs will end up at the SCSI layer; and (e) IOs are then sent to a Host Bus Adapter driver queue. From then on, IOs hit a disk array write cache and finally a back-end disk. Each example in (a)-(e) above introduces various degrees of latency.

Third, Least Recently Used (LRU)/Least Frequently Used (LFU)/Adaptive Replacement (ARC) cache replacement techniques all ultimately rely on building a frequency histogram of block storage access to determine a value for keeping or replacing a block from cache memory. Therefore, storage systems that rely on these cache management techniques will not be effective when servicing virtualization workloads especially Desktop VMs as the working set is too diverse for these techniques to manage cache consolidation and not cause cache fragmentation.

Fourth, in a virtualization environment, there typically exist multiple hierarchical caches in different subsystems—i.e. the Guest OS, the VM Hypervisor and a Storage Area Network (SAN)/Network Attached Storage (NAS) storage layer. As all the caches are independent of each other and unaware of each other, each cache implements the same cache replacement policies (e.g., algorithms) and thus all the caches end up all caching the same data within each independent cache. This results in an inefficient usage of the cache as cache capacity is lost to storing the same block multiple times. This is referred to as the cache inclusiveness problem and cannot be overcome without the use of external mechanisms to co-ordinate the contents of the multiple hierarchical caches in different subsystems.

Finally, SAN/NAS based storage systems that are under load ultimately will always be at a disadvantage to service virtualization workloads as they will need to service every IO operation from disk as the cache will be overwhelmed and fragment in the face of a large and diverse working set and because of diminished capacity within the caches due to the aforementioned cache inclusiveness problem.

Reference is now made to FIG. 1 where a conventional configuration 100 for a virtual machine (VM) includes a one or more users 140 who operate one or more thin clients 145 (e.g., terminals, desktop, tablet, or laptop PC's, devices connected via a KVM, a touch screen device, etc.) that are in communications 149 with a network 150 (e.g., LAN or WAN). Each user 140 generates a remote session symbolized as a virtual machines (VM) 135 (e.g., VM1, VM2, . . . , VMn). Each VM 135 comprises an instantiation of a virtual machine running on a computer program denoted as VM Hypervisor 130 (e.g., a conventional VM hypervisor program such as VMware® or other suitable virtual machine program). Here, conventional VM Hypervisor 130 is in communication with a system for processing, data storage, and data communications, such as a server rack 175 that includes a one or more servers 102a, 102b, 102c, . . . , 102n, and network gear 101 (e.g., switches, routers, etc.). Servers 102 can be a blade server or X86 based server, for example. Furthermore, each server 102 in rack 175 can include a CPU 103 (e.g., Intel X86 or AMD processors), memory 105 (e.g., DRAM or the like), and a storage device 107 (e.g., locally attached storage such as a HDD, SSD, or equivalent devices). Constituents of the rack 175 and VM Hypervisor 130 are in communications 131 with a storage network 110 (e.g., LAN, WAN, Wireless) configured to communicate 133 with a storage system 120 (e.g., an EMC or a NetApp storage system) comprised of one or more storage devices 125 (e.g., HDD's, RAID systems, cloud storage, etc.).

Each storage device 125 can include data 127a comprised of an OS Image, OS Runtime, Application Image, and Application Runtime, each of which is associated with the various VMs 135. Data 127a may be duplicated in one or more of the storage devices 107 in server rack 175 as denoted by duplicate data 127b. As described above in regards caches, it is undesirable to duplicate data, particularly if there is no advantage to having duplicate storage of the same data. Storage system 120 is particularly well suited to running read intensive operations such as web page browsing, for storage of files associated with programs such as MS Office (e.g., MS Word, Excel, and PowerPoint files), and for database applications that are read intensive, for example. However, programs or activity by users 140 or others that result in intensive write operations can create I/O latencies among components of the server rack 175, storage system 120, and storage network 110. I/O latencies can be caused by sequentially bound I/O operations to/from various storage elements in the rack 175 and/or storage system 120. For example, for write intensive operations to those storage elements, the write operations can be sequentially bound, regardless of whether the write data is the same or different, such that N write operations requires N sequentially executed write operations (e.g., one after another). The above performance weakness examples are a non-exhaustive list and there are other performance weaknesses in conventional virtualization technology.

There are continuing efforts to reduce data I/O latencies, data redundancy, and to improve processes, cache techniques, software, data structures, hardware, and systems for VM technology.

BRIEF DESCRIPTION OF THE DRAWINGS

Various embodiments are disclosed in the following detailed description and the accompanying drawings.

Figure 1:
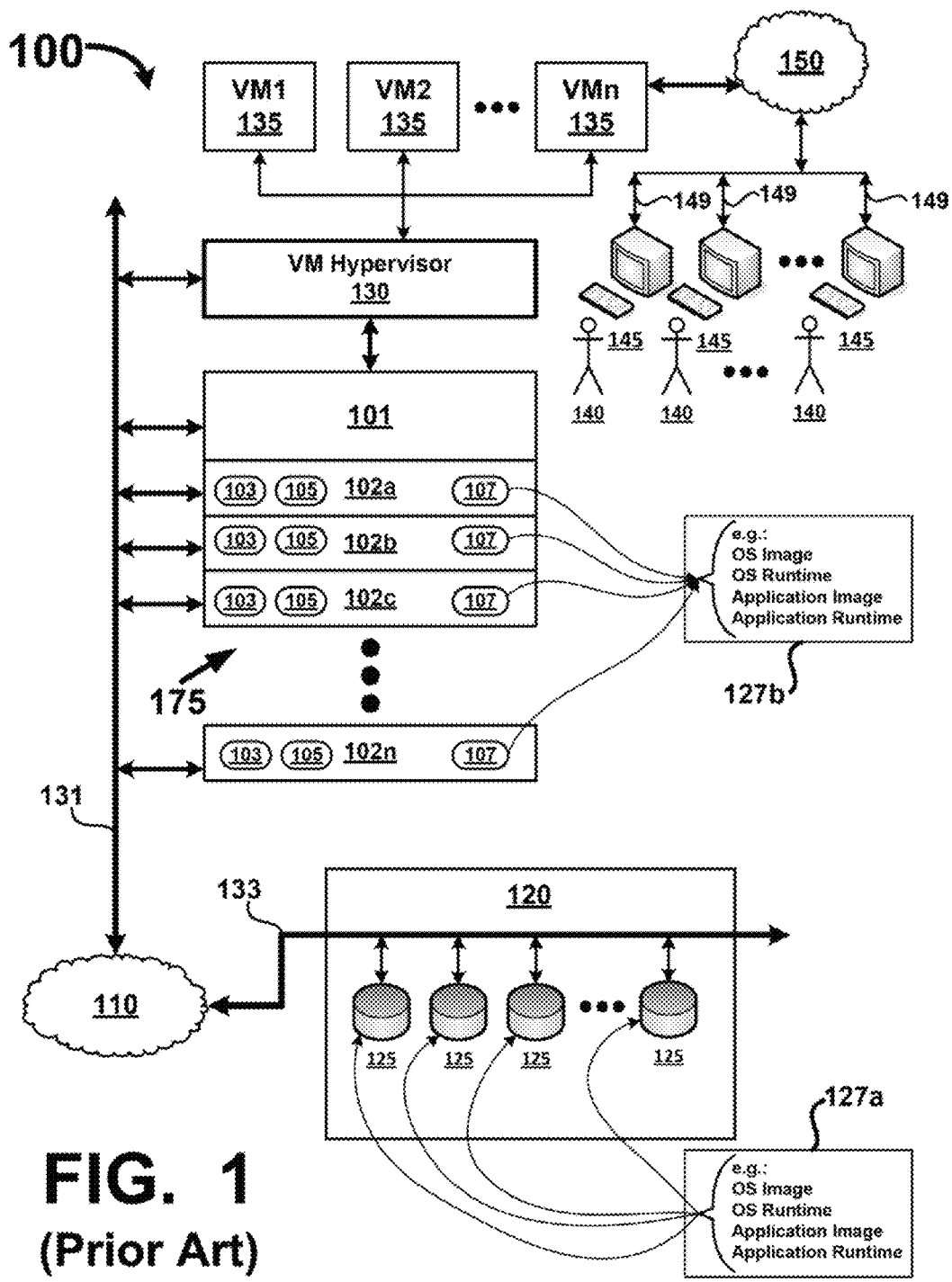
FIG. 1 depicts one example of a conventional configuration for Virtual Machine communications with a server rack and a storage network.

Although the above-described drawings depict various examples of the present application, the application is not limited by the depicted examples. It is to be understood that, in the drawings, like reference numerals designate like structural elements. Also, it is understood that the drawings are not necessarily to scale.

DETAILED DESCRIPTION

Various embodiments or examples may be implemented in numerous ways, including as a system, a process, an apparatus, a user interface, a GUI, or a series of program instructions on a non-transitory computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

In some examples, the described techniques may be implemented as a computer program or application ("application") or as a plug-in, module, or sub-component of another application. The described techniques may be implemented as software, hardware, firmware, circuitry, or a combination thereof. If implemented as software, then the described techniques may be implemented using various types of programming, development, scripting, or formatting languages, frameworks, syntax, applications, protocols, objects, or techniques, including ASP, ASP.net, .Net framework, Ruby, Ruby on Rails, C, Objective C, C++, C#, Adobe® Integrated Runtime™ (Adobe® AIR™), ActionScript™, Flex™, Lingo™, Java™, Javascript™, Ajax, Perl, COBOL, Fortran, ADA, XML, MXML, HTML, DHTML, XHTML, HTTP, XMPP, PHP, and others. Software and/or firmware implementations may be embodied in a non-transitory computer readable medium configured for execution by a general purpose computing system or the like. The described techniques may be varied and are not limited to the examples or descriptions provided.

The present application overcomes all of the limitations of the aforementioned conventional solutions for servicing I/O's generated by VM users and virtualization technology by providing a virtual aggregate that transparently replaces locally attached storage resources and/or storage systems such as SAS or NAS, for example.

The following description, for purposes of explanation, uses specific nomenclature to provide a thorough understanding of the application. However, it will be apparent to one skilled in the art that specific details are not required in order to practice the application. In fact, this description should not be read to limit any feature or aspect of the present application to any embodiment; rather features and aspects of one embodiment can readily be interchanged with other embodiments. Notably, not every benefit described herein need be realized by each embodiment of the present application; rather any specific embodiment can provide one or more of the advantages discussed above. In the claims, elements and/or operations do not imply any particular order of operation, unless explicitly stated in the claims. It is intended that the following claims and their equivalents define the scope of the application. Although the foregoing examples have been described in some detail for purposes of clarity of understanding, the above-described techniques are not limited to the details provided. There are many alternative ways of implementing the above-described application techniques. The disclosed examples are illustrative and not restrictive.

Figure 2A:
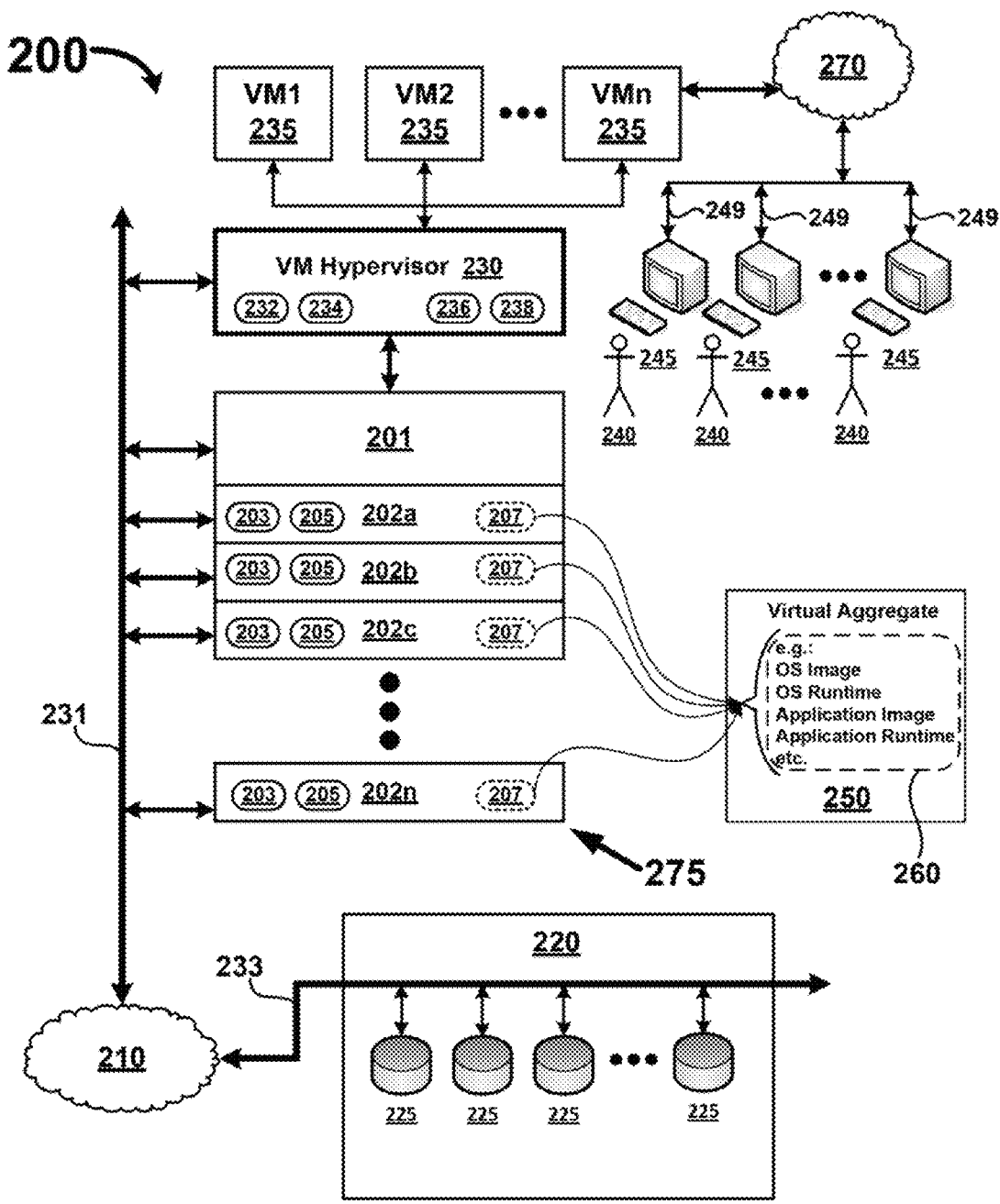
FIG. 2A depicts a block diagram of a configuration for Virtual Machine communications with a server rack and a storage network in which locally attached storage and/or a storage network are replaced and/or emulated by a virtual aggregate, according to various embodiments.

Turning now to FIG. 2A, a configuration 200 depicts one example of a Virtual Machine in communication with a server rack and a storage network in which locally attached storage is replaced and emulated by a virtual aggregate, according to various embodiments. Configuration 200 includes one or more users 240, thin clients 245 in communication 249 with a network 270 (e.g., LAN or WAN), one or more virtual machines 235 (e.g., VM1, VM2, . . . , VMn) under control of a VM Hypervisor 230, a server rack 275 including networking gear (e.g., a router, a switch, etc.), one or more servers 202 (e.g., 202a, 202b, 202c, . . . , 202n), a storage network 210 (e.g., LAN, WAN, Wireless), and a storage system 220 (e.g., EMC or NetApp systems) comprised of one or more storage devices 225 (e.g., HDD, SSD, RAID, or the like). Storage system 220, storage network 210, server rack 275, and VM Hypervisor 230 are in communications 231 and 233 with one another.

Servers 202 can be a blade server or X86 based server, for example. Furthermore, each server 202 in rack 275 can include a CPU 203 (e.g., Intel X86 or AMD processor), memory 205 (e.g., DRAM or the like), and virtual storage devices 207. In some examples, one or more of the servers 202 can include conventional storage devices (not shown) (e.g., locally attached storage such as a HDD, SSD, or equivalent devices). However, in configuration 200, virtual storage devices 207 are implemented as a virtual aggregate 250 that is an application running under VM Hypervisor 230. For example, the virtual aggregate 250 can be a subroutine or algorithm that is part of the computer program for VM Hypervisor 230. Therefore, unlike conventional configurations where the locally attached storage comprises physical storage devices (e.g., 107 of FIG. 1), virtual storage devices 207 of FIG. 2A need not be resident in rack 275 or any of its respective servers 202. Insofar as each server 202 is concerned, virtual storage devices 207 in virtual aggregate 250 appear to be locally attached storage that is resident in each server 202. Virtual aggregate 250 includes data 260 including but not limited to an OS Image, OS Runtime, Application Image, and Application Runtime, each of which is associated with the various VMs 235 running on VM Hypervisor 230 (e.g., VM instances 232, 234, 236, 238) and serviced by servers 202 in rack 275. Data 260 and I/O operations on data 260 are removed from conventional locally attached storage (e.g., such as 107 in FIG. 1) and/or the storage system 220. Additionally, read and write operations (e.g., caused by actions of users 240 or other) to data 260 in the virtual aggregate 250 can be in parallel (e.g., parallel read or parallel write operations) instead of being serially bound as described above in reference to FIG. 1.

Virtual aggregate 250 can be part of a program for the VM Hypervisor 230 or can be a separate program or algorithm. VM Hypervisor 230 and virtual aggregate 250 can run on the same hardware or different hardware (e.g., a computer, computer system, server, PC, or other compute engine).

Figure 2B:
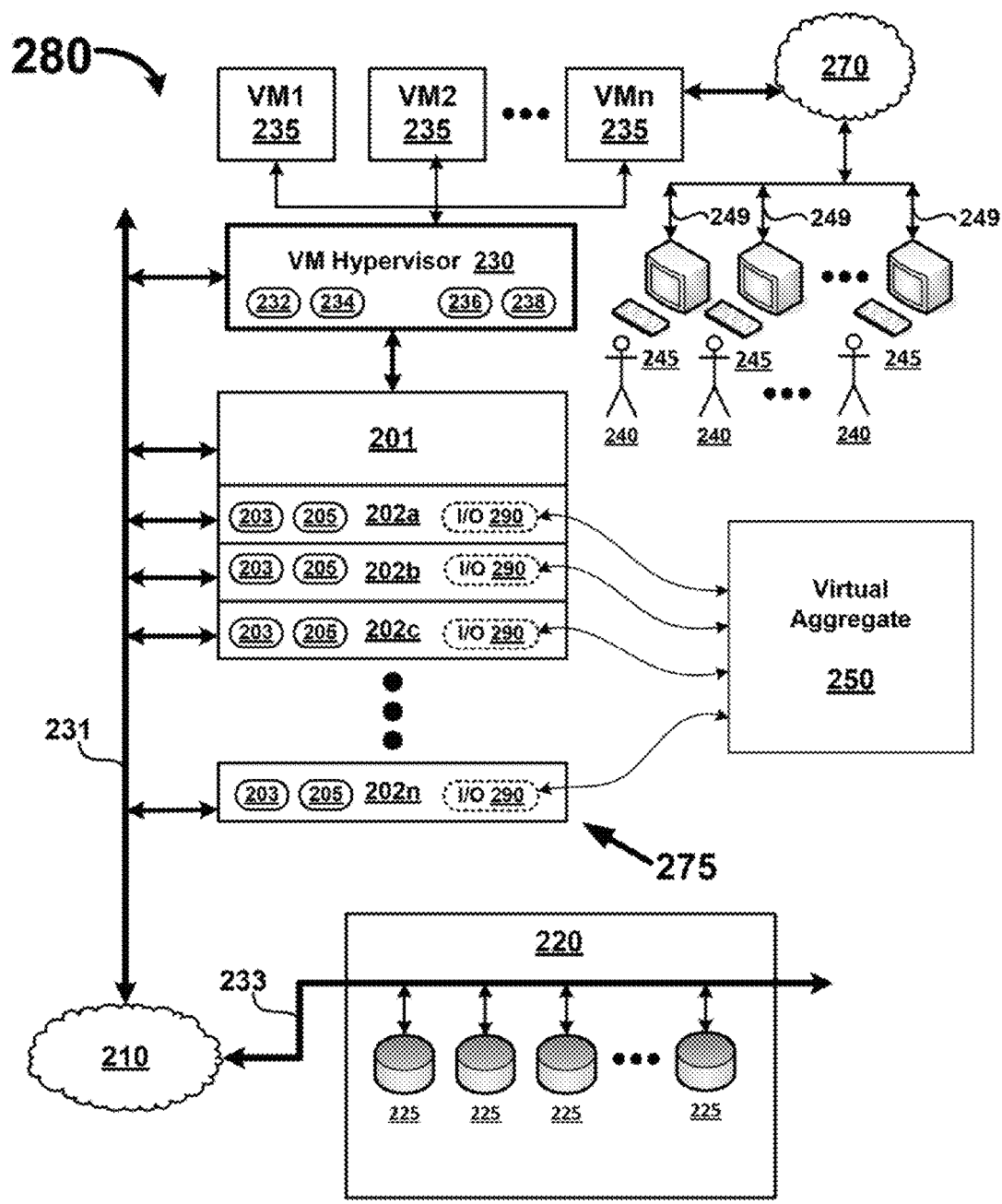
FIG. 2B depicts a block diagram of a configuration for Virtual Machine communications with a server rack and a storage network in which server data I/O generated by VM users is serviced by a virtual aggregate, according to various embodiments.
Figure 3:
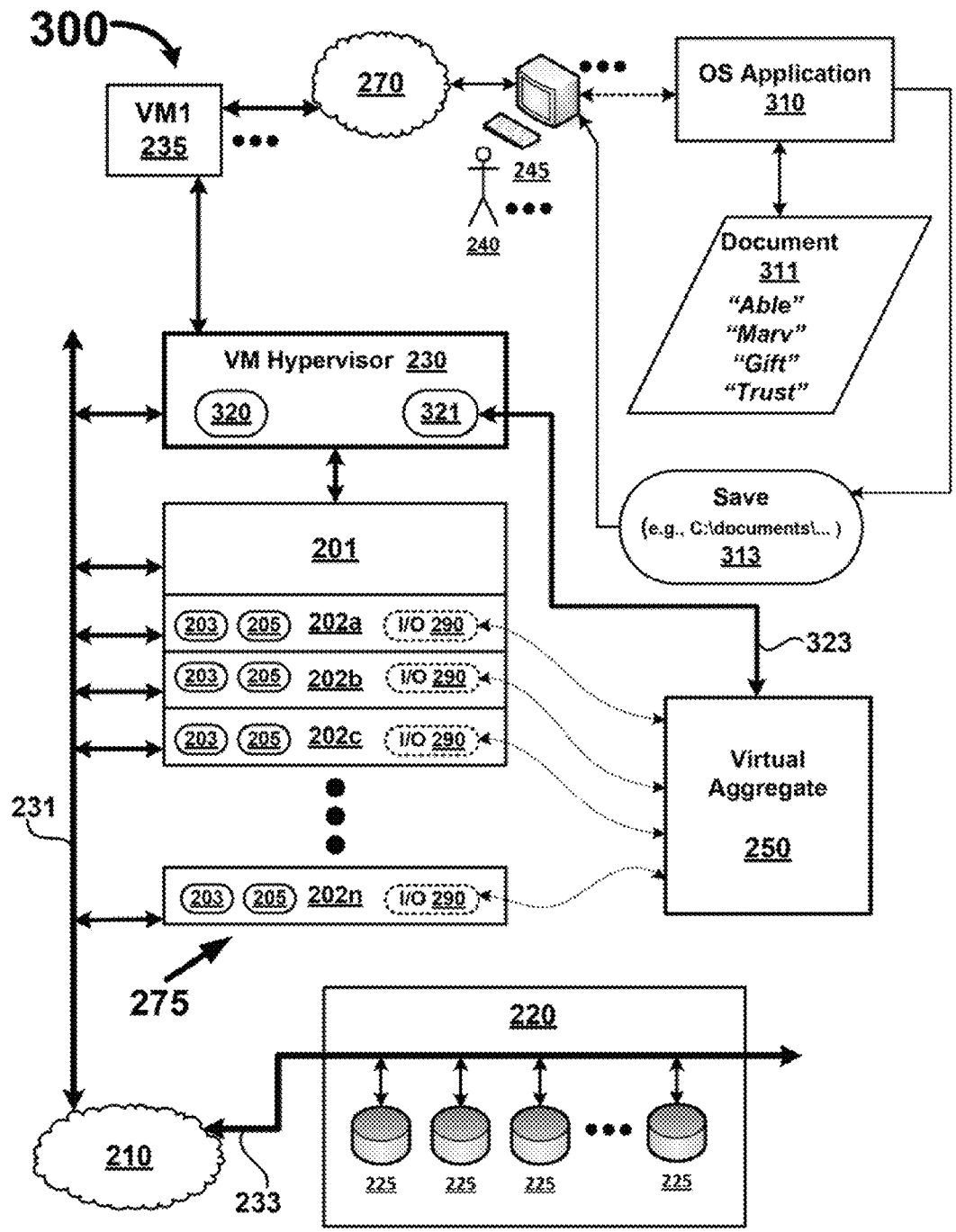
FIG. 3 depicts a more detailed block diagram of a configuration for Virtual Machine communications with a server rack and a storage network in which server data I/O generated by a VM user is serviced by a virtual aggregate, according to various embodiments.

Moving on to configuration 280 of FIG. 2B, data I/O 290 (e.g., reads, writes, or other generated by VM users 240) in each server 202 is serviced by the virtual aggregate 250. Virtual aggregate 250 is configured to facilitate parallel reads of data 260 and parallel writes of data 260 into a data structure of the virtual aggregate 250 as will be described below. In FIGS. 2A, 2B, and 3, emulation of locally attached storage or system storage need not occur in all servers 202 at the same time. Therefore, some of the servers 202 may not be actively generating operations on data 260 in virtual aggregate 250 such that at any given time all or less than all of the servers 202 in rack 275 may be actively generating operations on the virtual aggregate 250. Actions by users 240 may prompt one or more of the servers 202 to access virtual aggregate 250 for read, write, or other operation.

Reference is now made to FIG. 3, where configuration 300 depicts a more detailed example of VM communication with server rack 275. Here, virtual aggregate 250 services VM communications caused by data I/O generated by users 240. As one example, an OS application 310 (e.g., a MS Office application such as Word, Excel, PowerPoint, or other) operates on a document 311 (e.g., a file) that includes data representing the words: "Able"; "Marv"; "Gift"; and "Trust". A user 245 performs a save operation 313 on document 311 prompting an I/O 290 operation in one or more of the servers 202 in rack 275. Virtual aggregate 250 controls where the data and duplicates of the data for the words in document 311 are stored in the virtual aggregate 250. Virtual aggregate 250 includes a data structure operative to ensure redundant locations for the words in document 311 are stored at multiple locations within the virtual aggregate 250 as will be explained in greater detail below. Words in document 311 may be stored in virtual locally attached storage (e.g., virtual aggregate 250) in more than one of the servers 202. Providing redundancy of data allows for one or more of the servers to be unavailable (e.g., crashed, off line, hardware failure, software failure, etc.) and yet enough servers 202 remain available to reconstruct the words in document 311 because there are duplicate copies of that data (e.g., in virtual aggregate 250) distributed among the other available servers 202. Actions by user 245 (e.g., the save command 313) that generated the I/O 290 are communicated from VM1 235 to VM instance 321 to operate on virtual aggregate 250 such that data is written to or read from the data structure of virtual aggregate 250. In some examples, VM Hypervisor 230 can activate more than one virtual aggregate 250, with each virtual aggregate 250 servicing the virtual storage and data I/O needs for different users 240 and their respective VM sessions running on the VM Hypervisor 230.

Figure 4A:
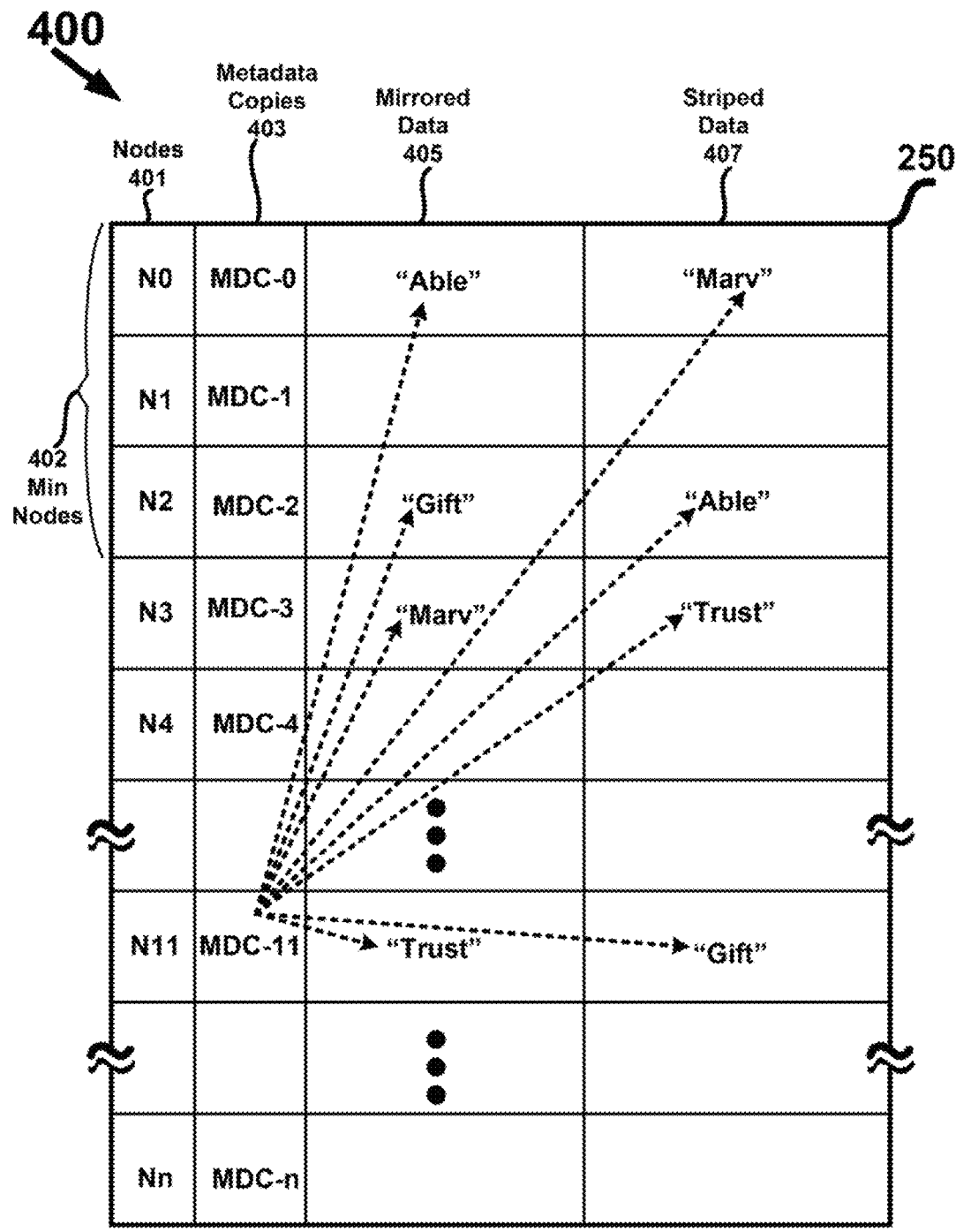
FIG. 4A depicts an example of a virtual aggregate including nodes, metadata, mirrored data, and striped data fields for each node in the virtual aggregate, according to various embodiments.

Attention is now directed to FIG. 4A where one example 400 of an implementation of the virtual aggregate 250 is described. Virtual aggregate 250 comprises a data structure including but not limited to: a plurality of nodes 401 denoted as N0-Nn; metadata copies 403 associated with each node 401 and denoted as MDC-0-MDC-n (for nodes N0-Nn); mirrored data 405 associated with each node 401; and striped data 407 associated with each node 401. Conventional metadata structures used for implementing a VM typically describe a set and a slot, where a slot maps to a specific sector on a physical HDD or equivalent, such as the HDD associated with locally attached storage 107 and/or storage system 120 of FIG. 1. In contrast, metadata copies 403 describe a set, as slot, and a node; wherein each node 401 includes information as to which ones of the plurality of nodes 401 includes copies of data for a specific sector within the virtual aggregate 250. The data structure for virtual aggregate 250 is not disposed in locally attached storage in server rack 275 or in storage devices 225 of storage system 220, although as far as users 240 and VMs 235 (e.g., VM1-VMn) are concerned, data I/O is being written/read to a HDD even though data 110 is actually being written/read to a virtual HDD in the form of virtual aggregate 250 and is transparent to the users 240 and their respective VMs 235.

Implementing storage of data for VMs, such as the data 260 of FIG. 2A addresses several challenges, namely data redundancy in the event of storage device failure and parallelization of data I/O, that is, providing for parallel write and read operations to fields of nodes 401 within virtual aggregate 250. First, virtual aggregate 250 provides advantages in how data is dispersed throughout the fields of the data structure that allows for redundancy of data in the event one or more nodes in the virtual aggregate 250 fails (e.g., is unavailable for data I/O for any reason). Virtual aggregate 250 can be configured to tolerate a N–X failure scenario, where N>X, and where N comprises the total number of nodes 401 and X comprises the minimum number of nodes 401 that are required to be available (e.g., for data I/O) for complete redundancy of data in the virtual aggregate 250. Second, while data I/O is in flight, writes or reads to multiple nodes 401 can occur in parallel using mirroring and striping techniques. Data being mirrored and striped need not be related. Accordingly, data I/O is not serially bound. Mirroring and striping to different nodes 401 also addresses the aforementioned advantage of having redundant data dispersed throughout the virtual aggregate 250.

Referring again to virtual aggregate 250, metadata copies 403 require a minimum 402 of three (3) nodes 401 to provide redundant mirroring and striping of data such as: "Able"; "Marv"; "Gift"; and "Trust", as well as the metadata 403 itself. Therefore, at least three copies of the data and metadata 403 across all three of the nodes 401 are required for a fully coherent system. Adding additional nodes 401 increments the number of locations that duplicate data and metadata 403 can be placed within virtual aggregate 250. The minimum number of three nodes 402 need not be contiguous nodes (e.g., N0, N1, N2) as depicted in FIG. 4A. Furthermore, X can be an integer larger than 3 (e.g., X=4, or 5, or 6, etc.) A full copy of the metadata is available at each node 401 and the program running the virtual aggregate 250 insures full synchronization of metadata across all of the nodes 401. The minimum 402 of three nodes is required because two of the three nodes 401 are needed for representation of the actual data and one of the three nodes 401 is needed to store parity data (e.g., one or more parity bits). Examples of nodes 401 and their respective metadata 403 and data payloads (405 and 407) will be described in greater detail below in reference to FIGS. 5A-5C.

Figure 4B:
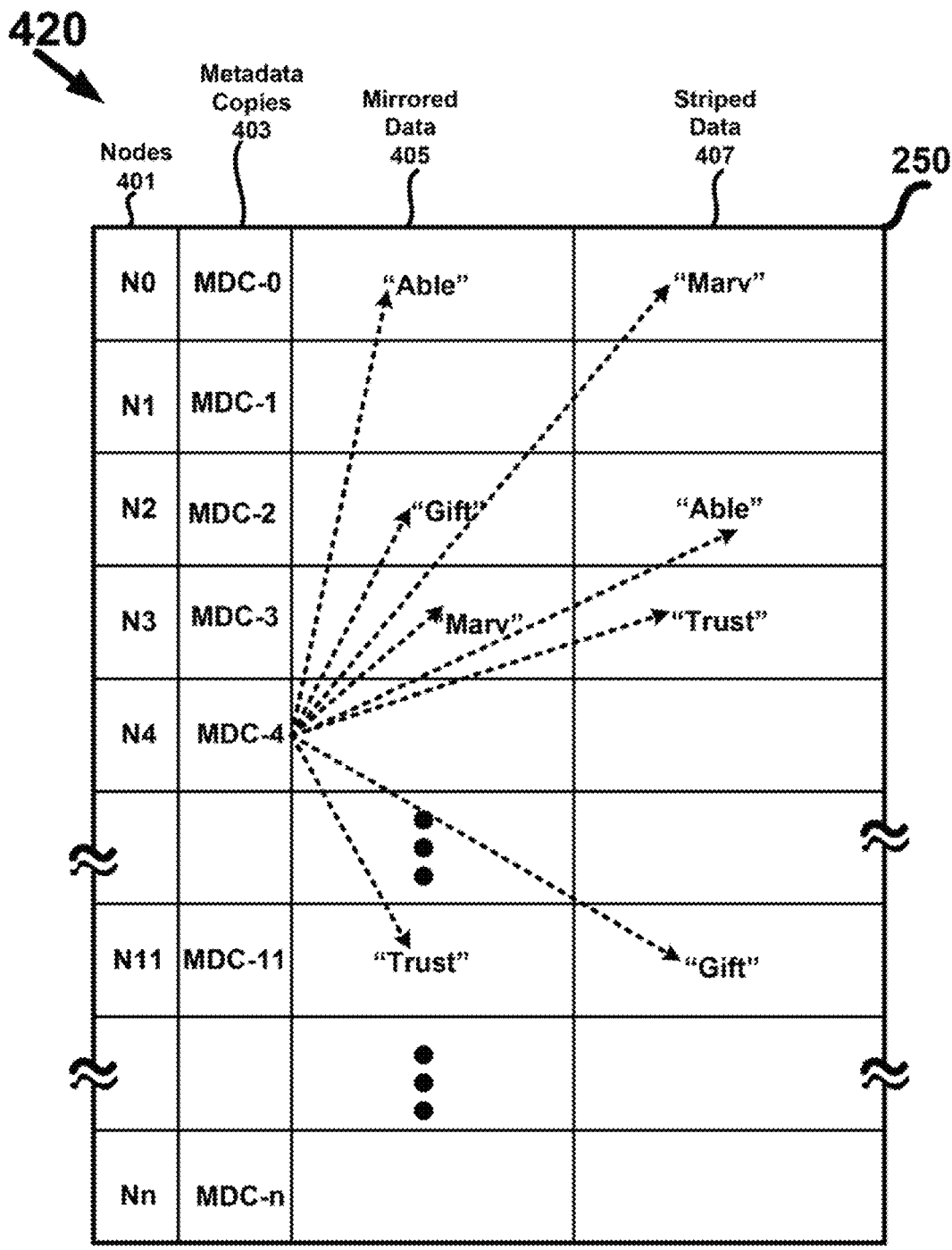
FIG. 4B depicts another example of a virtual aggregate including a node in which the metadata includes pointers to the mirrored and striped data of other nodes in the virtual aggregate, according to various embodiments.
Figure 4C:
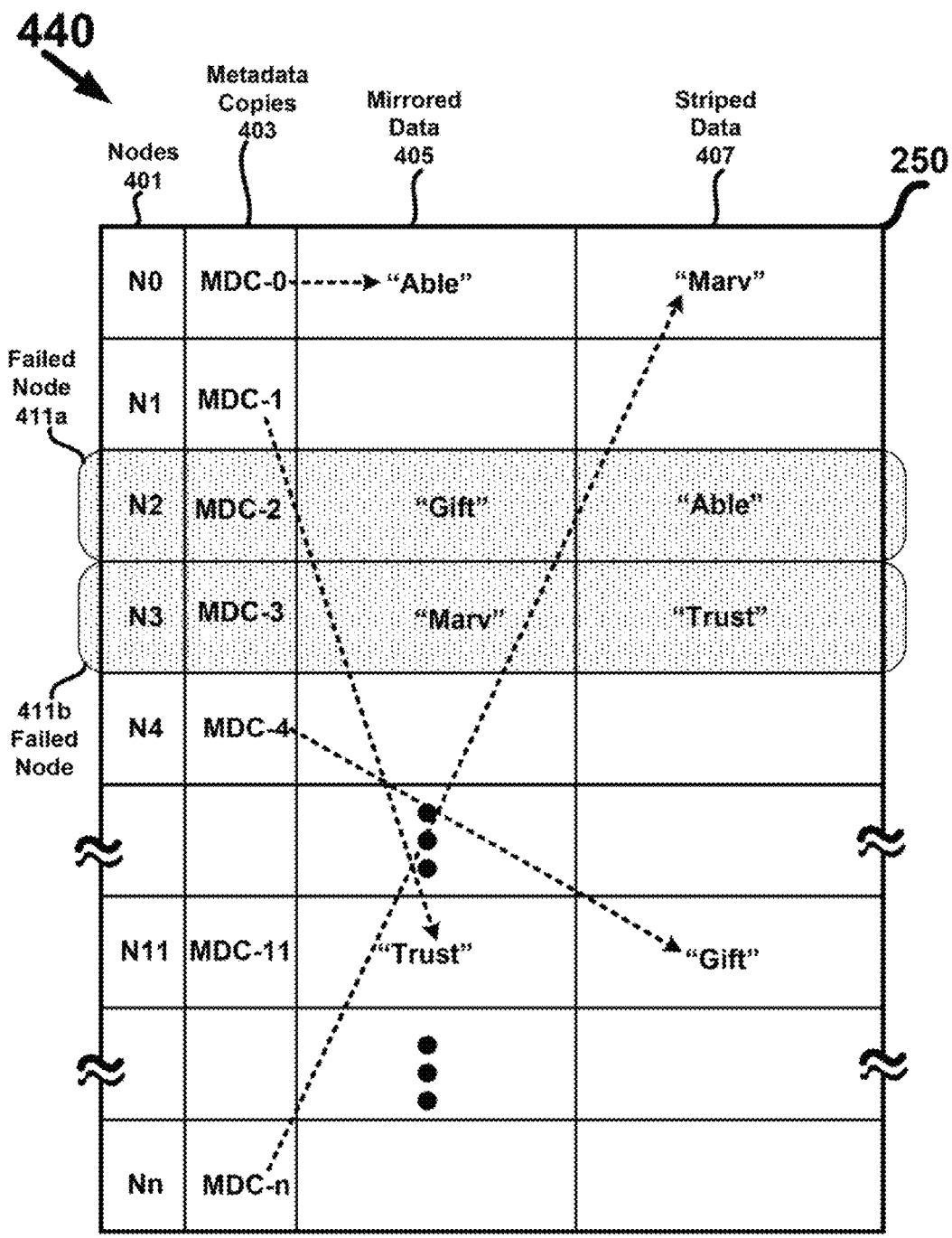
FIG. 4C depicts an example of a virtual aggregate in which two nodes have failed and metadata from non-failed nodes is used to point to mirrored and striped data in non-failed nodes to reconstruct data from the failed nodes, according to various embodiments.

As one example, as depicted in FIG. 4C, in a five node scenario where nodes N2 and N3 have failed, full copies of metadata 403 are available in nodes N0, N1, and N4. Each metadata copy 403 in nodes N0, N1, and N4 includes pointers to copies of redundant data to that in failed nodes N2 and N3 as well as full identical copies of the metadata 403 and pointers to the metadata 403 across nodes N0, N1, and N4.

As another example, user 245 saves a MS Word document via the Windows OS to a directory "c:\documents" and that word file contains the four words "Able"; "Marv"; "Gift"; and "Trust". Assume for purposes of explanation, that each of those four words are 1 KB in size such that the save operation would save 4 KB to system storage via VM Hypervisor 230. To the VM 235 that is servicing the user's 245 Windows OS save operation, the resulting write operation to the virtual aggregate 250 appears to be a write operation to a physical storage device (e.g., a HDD). However, virtual aggregate 250 takes the document and writes it into five nodes 401, for example, of the data structure in 4 KB blocks, performing a mirroring operation on three nodes within the data structure to make full copies of the mirrored data 405 and metadata 403. Which nodes are selected for the mirroring operation can be determined by factors including but not limited to capacity, access speed, data type, etc. to find an optimum node to assign the mirrored copies to. Similarly, full copies of the data are to be striped to the striped data field 407 of each of the three nodes, and the striping operation can be determined by factors including but not limited to capacity, access speed, data type, etc. to find an optimum node to assign the striped copies to. Metadata copies 403 of all the nodes in virtual aggregate 250 are updated to be identical to one another such that content and location data are identical in each nodes metadata field. In FIG. 4A: Node N0 has "Abel" in its mirrored data field 405 and "Marv" in its striped data field 407; Node N2 has "Gift" and "Able" in its mirrored and striped data fields; Node N3 has "Marv" and "Trust" in its mirrored and striped data fields; Node N11 has "Trust" and "Gift" in its mirrored and striped data fields. In some examples, virtual aggregate 250 may write full copies of metadata 403, mirrored data 405, and striped data 407 to more than three nodes, and the configuration in FIG. 4A is just one non-limiting example of how the data structure for virtual aggregate 250 can be implemented. The aforementioned fragmentation operations (e.g., chunking operations) allows for parallelization of reads and writes to the virtual aggregate 250. After the chunking operation, location and contents of the metadata are known and parallel reads of content in virtual aggregate 250 can occur from any location with the virtual aggregate 250, and parallel writes to the virtual aggregate 250 can occur from any location within virtual aggregate 250.

In FIG. 4A, metadata 403 for node N11 includes pointers (denoted as dashed arrows) to its mirrored and striped data fields as well as to the mirrored and striped data fields of all the other nodes 401 that have copies of the word document that was saved. In FIG. 4B, in that the metadata 403 of each node 401 is an identical copy of that in any other node 401, metadata 403 in other nodes 401, such as node N4, also include pointers to the mirrored and striped data of nodes N0, N2, N3, and N11. Metadata 403 undergoes a hashing operation to generate hash values as key values. Examples of the hashing operations include MD-5, SHA, and other like hash functions. Conventional metadata describes a set and slot, where the slot maps to a sector number on a disk of a HDD. In contrast, metadata 403 describes a set, a slot, and a node and the node describes where copies of a sector are available on which nodes 401 of the virtual aggregate 250. Locality of reference of a specific node 401 in the virtual aggregate 250 is required when a seek to a specific node occurs.

In FIG. 4C, virtual aggregate 250 includes failed nodes N2 and N3 denoted as 411a and 411b and their associated metadata copies MDC-2 and MDC-3 as well as mirrored and striped data for "Gift", "Able", "Marv", and "Trust". However, other nodes 401 include in their metadata fields 403 copies of the data payloads and metadata of failed nodes 411a and 411b. Accordingly, pointers in metadata fields MDC-0, MDC-1, MDC-4, and MDC-n include pointers to other nodes were redundant copies for the words "Able"; "Marv"; "Gift"; and "Trust" are stored and can be accessed for read or write.

Figure 4D:
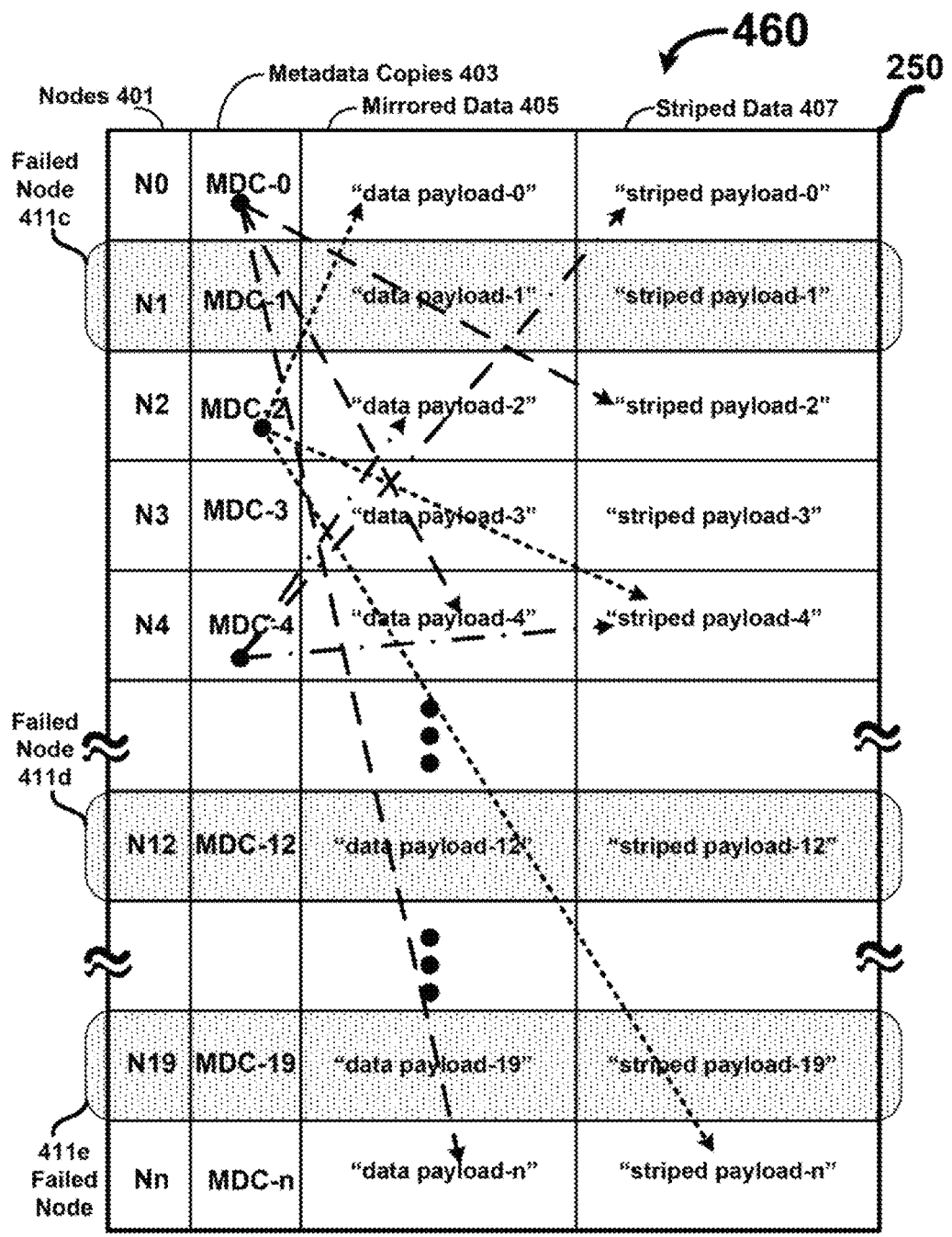
FIG. 4D depicts another example of a virtual aggregate in which three nodes have failed and metadata from non-failed nodes is used to point to mirrored and striped data in non-failed nodes to reconstruct data from the failed nodes, according to various embodiments.

FIG. 4D depicts another example where three failed nodes denoted as 411c, 411d, and 411e are present in the virtual aggregate 250 and the other non-failed nodes 401 include pointers in their metadata fields 403 to mirrored and striped data payloads dispersed among the non-failed nodes 401. Accordingly, redundant data exists in the non-failed nodes 401 and can be accessed for read or write despite failed nodes 411c, 411d, and 411e.

Figure 5A:
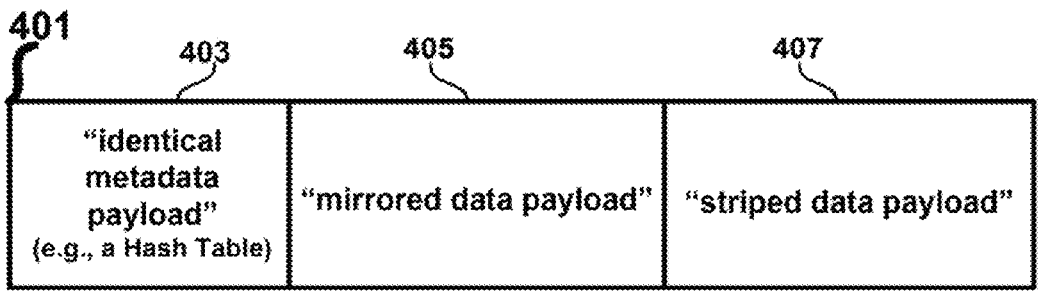
FIG. 5A depicts a block diagram of an example data structure for a node including an identical metadata payload, a mirrored data payload, and a striped data payload, according to various embodiments.

Referring now to FIG. 5A, a block diagram depicts one example of a data structure for nodes 401 in virtual aggregate 250. Fields of node 401 include but are not limited to a metadata field 403 including an "identical metadata payload" that can be in the form a hash table (e.g., generated by a hashing function), a mirrored data field 405 including a "mirrored data payload", and a striped data field 407 including a "striped data payload".

Figure 5B:
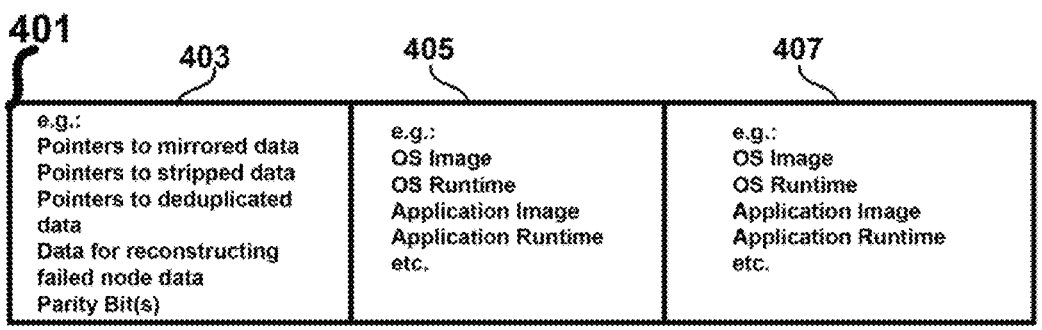
FIG. 5B depicts a block diagram of another example of a data structure and data used to populate the fields of a node, according to various embodiments.
Figure 5C:
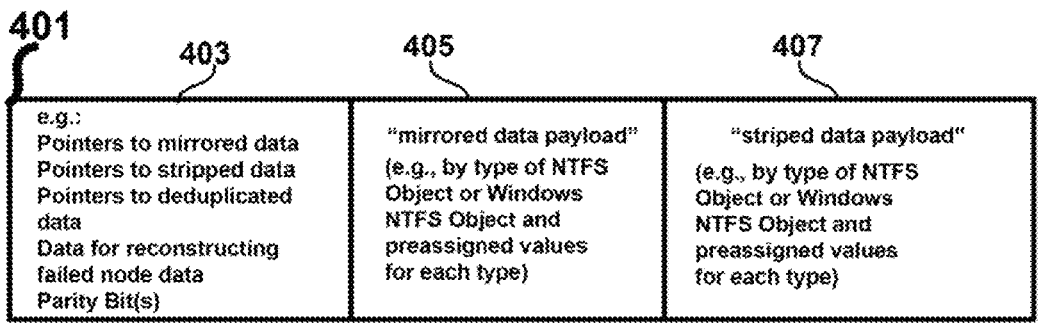
FIG. 5C depicts a block diagram of yet another example of a data structure and data used to populate the metadata, mirrored, and striped fields of a node, according to various embodiments.

FIGS. 5B and 5C depict other examples of block diagrams of data structures for a node 401 and the data payloads in each field of node 401 in FIG. 5A. For example, data payload for the metadata field 403 can include pointers to the mirrored data, striped data, and deduplicated data, for reconstructing failed node data, and a parity bit or parity bits.

Figure 6A:
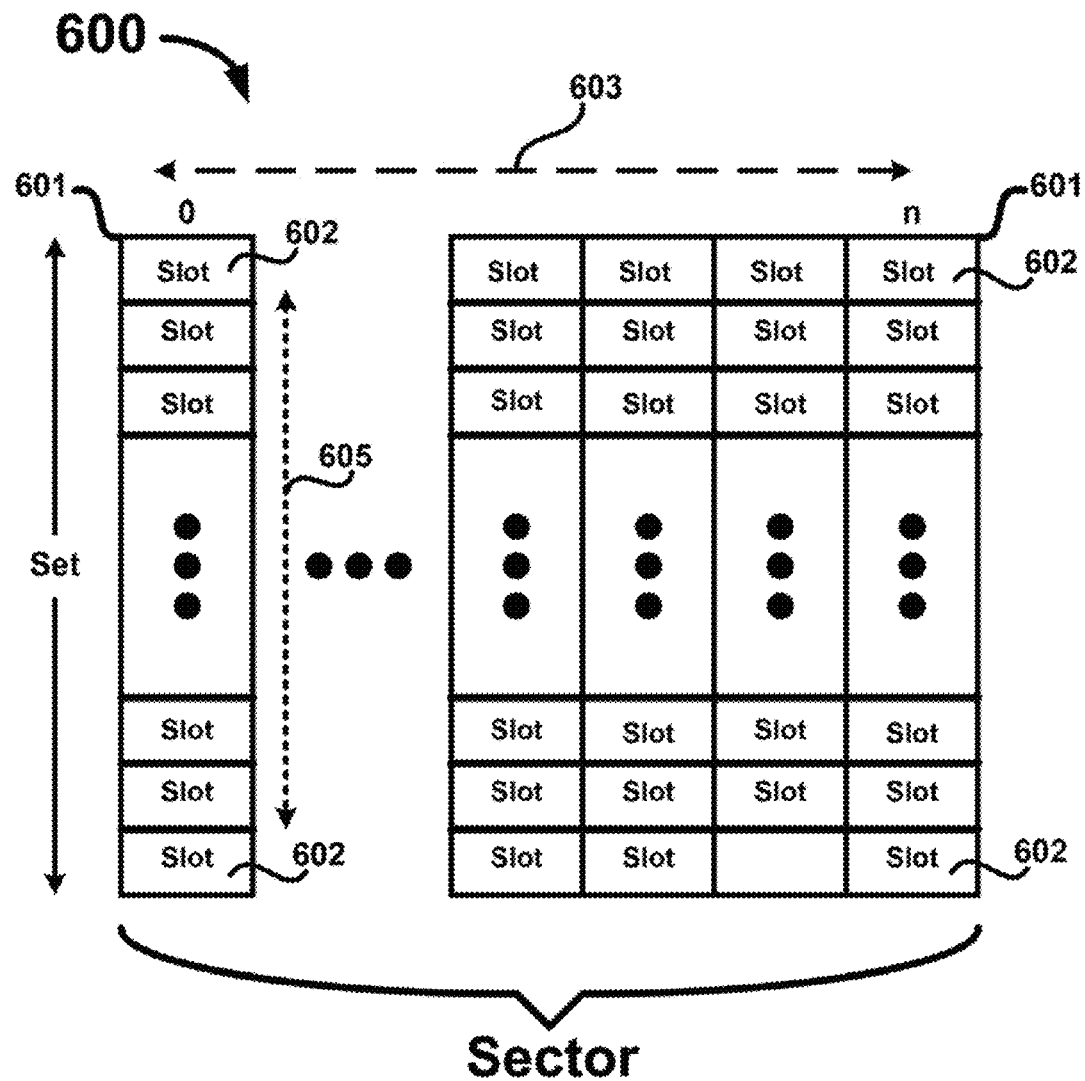
FIG. 6A depicts a diagram of a set, slots in the set, and a sector comprised of sets and slots as an example of data included in and identified by metadata in each node of a virtual aggregate, according to various embodiments.
Figure 6B:
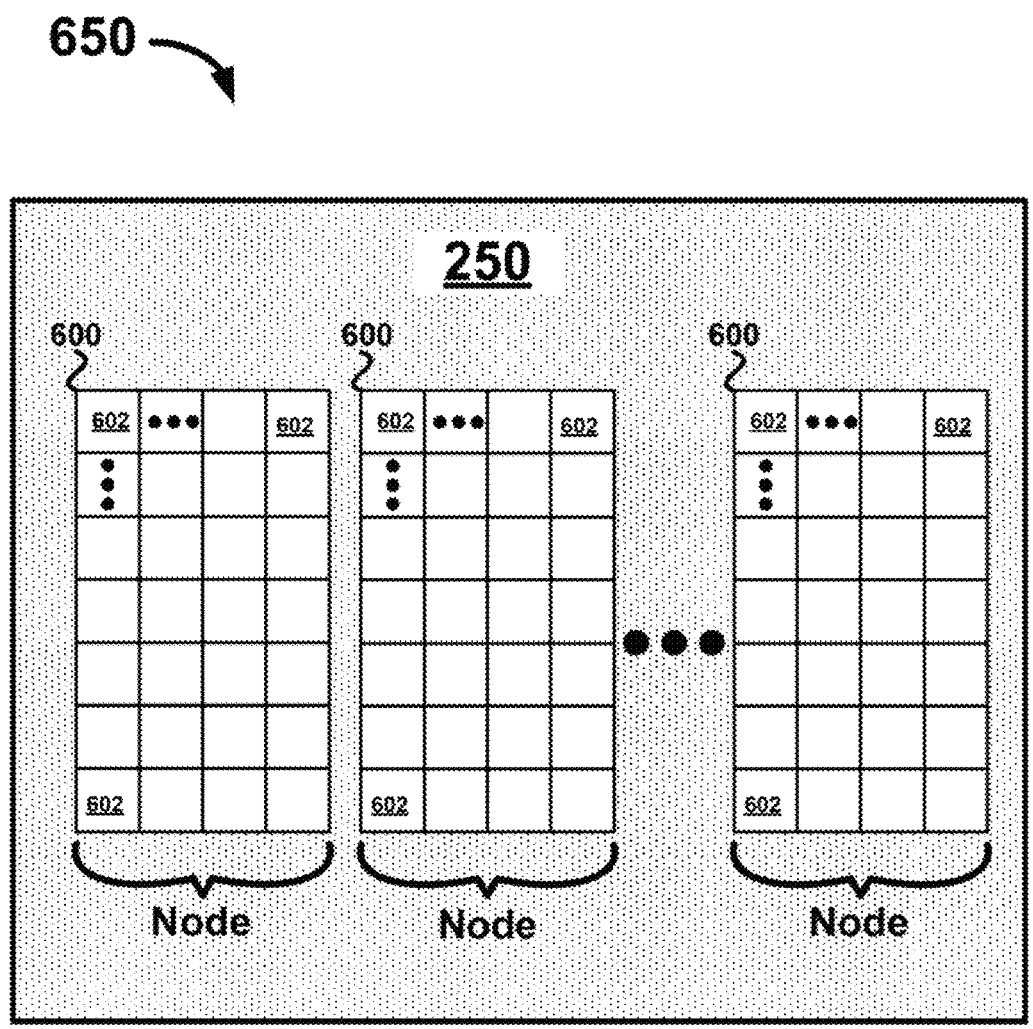
FIG. 6B is a diagram depicting a sector identified in metadata that maps to a node in a virtual aggregate, according to various embodiments.

FIG. 6A depicts a diagram of a set, slots in the set, and a sector as data included in and identified by metadata 403 in each node 401 of the virtual aggregate 250. Each set 601 includes a plurality of slots 602 along directions 603 and 605. In FIG. 6B metadata 403 in virtual aggregate 250 includes pointers to specific nodes 401 associated with a specific sector 600 in virtual aggregate 250 thus providing locality of reference for a seek to a specific sector 600.

Figure 7:
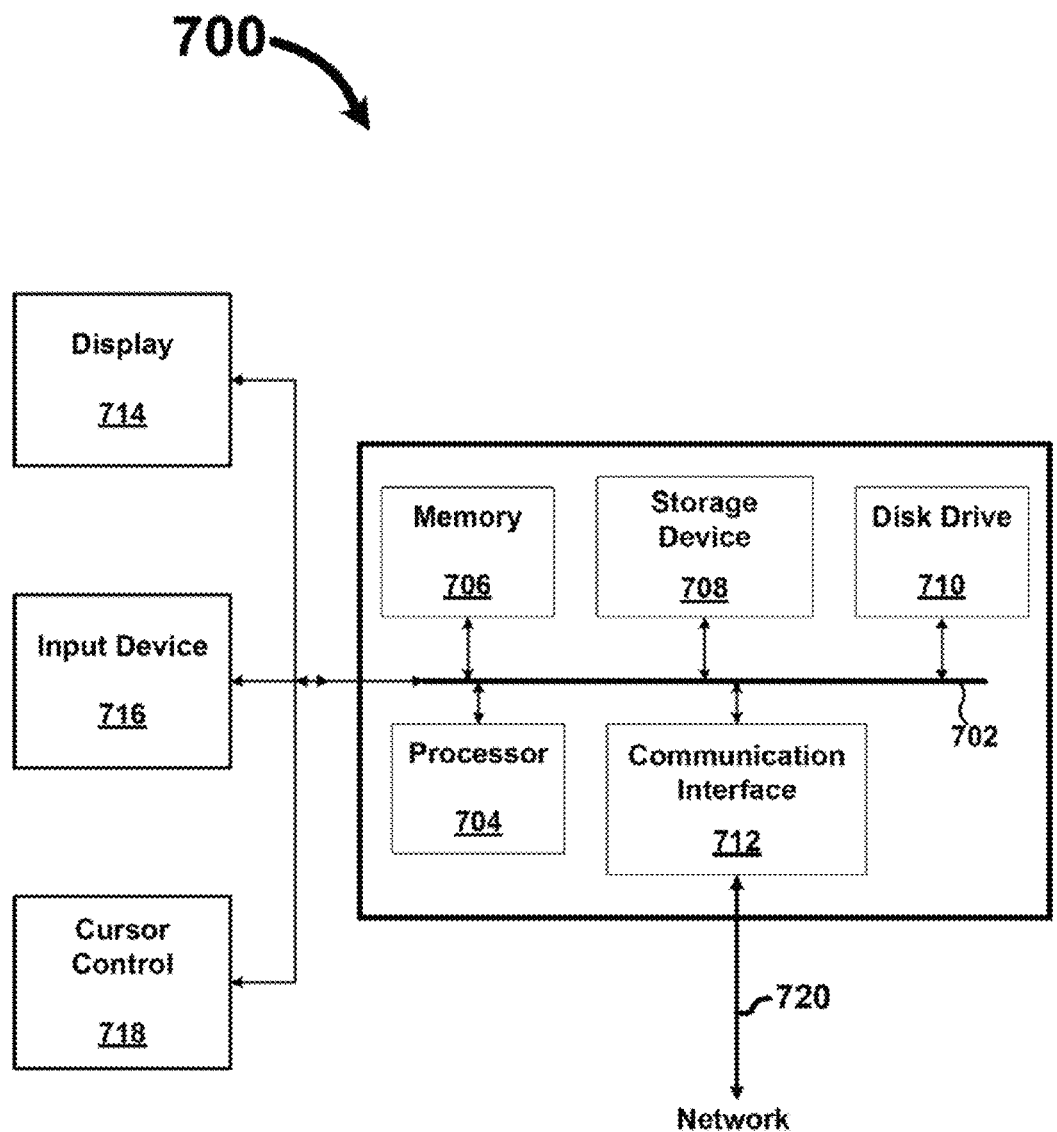
FIG. 7 illustrates an exemplary computer system suitable for implementing a computing system including an application running a virtual aggregate for a virtual machine.

FIG. 7 depicts a block diagram of one example of a computer system 700 configured to implement an application that executes virtual aggregate 250. In some examples, computer system 700 may be used to implement computer programs, applications, methods, processes, or other software to perform the above-described techniques for the VM Hypervisor 230, the application that executes virtual aggregate 250, or both. Computer system 700 includes a bus 702 or other communication mechanism for communicating information, which interconnects subsystems and devices, such as processor 704, system memory 706 (e.g., RAM and DRAM), storage device 708 (e.g., ROM, Flash Memory, SSD, etc.), disk drive 710 (e.g., magnetic or optical), communication interface 712 (e.g., modem or Ethernet card), display 714 (e.g., CRT, LCD, or touch screen), input device 716 (e.g., keyboard), and cursor control 718 (e.g., mouse or trackball).

According to some examples, computer system 700 performs specific operations by processor 704 executing one or more sequences of one or more instructions stored in system memory 706. Such instructions may be read into system memory 706 from another computer readable medium, such as static storage device 708 or disk drive 710. In some examples, disk drive 710 can be implemented using a HDD, SSD, or some combination thereof. In some examples, hard-wired circuitry may be used in place of or in combination with software instructions for implementation.

The term "computer readable medium" refers to any non-transitory tangible medium that participates in providing instructions to processor 704 for execution. Such a medium may take many forms, including but not limited to, non-volatile media and volatile media. Non-volatile media includes, for example, Flash memory, optical or magnetic disks, such as disk drive 710. Volatile media includes dynamic memory, such as system memory 706. Common forms of computer readable media includes, for example, floppy disk, flexible disk, hard disk, optical disk, magnetic tape, any other magnetic medium, CD-ROM, DVD-ROM, any other optical medium, punch cards, paper tape, any other physical medium with patterns of holes, RAM, PROM, EPROM, FLASH-EPROM, any other memory chip or cartridge, or any other medium from which a computer can read. Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media includes coaxial cables, copper wire, and fiber optics, including wires that comprise a bus (e.g., bus 702) for transmitting a computer data signal.

In some examples, execution of the sequences of instructions may be performed by a single computer system 700. According to some examples, two or more computer systems 700 coupled by communication link 720 (e.g., LAN, PSTN, or wireless network) may perform the sequence of instructions in coordination with one another. Computer system 700 may transmit and receive messages, data, and instructions, including program, i.e., application code, through communication link 720 and communication interface 712. Received program code may be executed by processor 704 as it is received, and/or stored in disk drive 710, or other storage for later execution. Single computer system 700 may be replicated, duplicated, or otherwise modified to service the needs of a virtualized desktop environment, VM Hypervisor 230, and virtual aggregate 250 as described herein. In some examples, there may be multiple processors 704.

The foregoing description, for purposes of explanation, uses specific nomenclature to provide a thorough understanding of the application. However, it will be apparent to one skilled in the art that specific details are not required in order to practice the application. In fact, this description should not be read to limit any feature or aspect of the present application to any embodiment; rather features and aspects of one embodiment can readily be interchanged with other embodiments. Notably, not every benefit described herein need be realized by each embodiment of the present application; rather any specific embodiment can provide one or more of the advantages discussed above. In the claims, elements and/or operations do not imply any particular order of operation, unless explicitly stated in the claims. It is intended that the following claims and their equivalents define the scope of the application. Although the foregoing examples have been described in some detail for purposes of clarity of understanding, the above-described techniques are not limited to the details provided. There are many alternative ways of imple-

What is claimed is:

1. A method, comprising:
    configuring a non-transitory data storage medium to store a virtual aggregate including N nodes, where N is an integer that is ≥3, each node having a node block size;
    receiving data to be stored among the N nodes;
    parsing the data into M data blocks where M is an integer that is ≥1;
    performing a hashing function on each data block to generate metadata (MD) comprising a hash table that is identical for copies of the MD;
    selecting for each data block a selected node of the N nodes, wherein the selecting comprises:
        mirroring the MD in a metadata field of the selected node,
        mirroring a data payload of the data block in a mirrored data field of the selected node, and
        striping the data payload of the data block in a striped data field of one or more other nodes of the N nodes that are not the selected node; and
    repeating the selecting until the MD and data payloads of all the M data blocks have been mirrored and striped into at least a portion of the N nodes.

2. The method of claim 1, wherein the non-transitory data storage medium comprises a storage medium selected from the group consisting of random access memory (RAM), volatile RAM, non-volatile RAM, at least one hard disk drive (HDD), at least one solid-state drive (SSD), and at least one RAM drive.

3. The method of claim 2, wherein the volatile RAM comprises dynamic random access memory (DRAM).

4. The method of claim 2, wherein the non-volatile RAM comprises Flash memory.

5. The method of claim 1, wherein M is ≤N.

6. The method of claim 1, wherein M is ≥N and M includes a plurality of duplicate data blocks and only one of each duplicate data block is parsed into the M data blocks.

7. The method of claim 1, wherein the virtual aggregate is configured to replace, to emulate, or to replace and emulate locally attached storage for a plurality of servers.

8. The method of claim 7, wherein the plurality of servers are configured in a server rack.

9. The method of claim 7, wherein the plurality of servers are configured in a plurality of server racks.

10. The method of claim 7, wherein the locally attached storage that is replaced, emulated, or replaced and emulated by the virtual aggregate comprises at least one hard disk drive (HDD).

11. The method of claim 1, wherein the virtual aggregate is configured to replace, to emulate, or to replace and emulate a storage area network (SAN), network attached storage (NAS), or both.

12. The method of claim 1, wherein the MD includes parity data.

13. The method of claim 1, wherein the MD includes a plurality of pointers to mirrored data fields, striped data fields, or both in other nodes in the virtual aggregate.

14. The method of claim 1, wherein data payloads in at least a portion of the data received comprises virtual machine (VM) data.

15. The method of claim 14, wherein the VM data comprises one or more data types selected from the group consisting of an operating system (OS) image, and OS runtime, and application image, and an application runtime.

16. The method of claim 1, wherein the virtual aggregate is in data communication with a plurality of servers and each server including a least one central processing unit (CPU), at least one random access memory (RAM), and the virtual aggregate is operative to replace, to emulate, or to replace and emulate one or more locally attached hard disk drives (HDD) in each server.

17. The method of claim 1, wherein the node block size is 4 kB.

18. The method of claim 1, wherein each data block has a size that does not exceed the node block size.

19. The method of claim 1, wherein a selected one or more of mirroring the MD, mirroring the data payload, or stripping the data payload occurs in parallel or substantially in parallel across a plurality of the N nodes.

20. The method of claim 1, wherein the MD is included in a metadata hash table generated by the hashing function and the metadata hash table and its associated MD are stored in the metadata field of the selected node.

21. The method of claim 1, wherein the MD identifies a set in a slot.

22. The method of claim 21, wherein the slot identifies a sector.

23. The method of claim 22, wherein the sector identifies a node in the virtual aggregate.

24. The method of claim 1, wherein writing data to one or more of the N nodes of the virtual aggregate occurs in parallel.

25. The method of claim 1, wherein reading data from one or more of the N nodes of the virtual aggregate occurs in parallel.

26. The method of claim 1, wherein all the N nodes include identical copies of the MD.

27. A non-transitory computer readable medium including instructions that, when executed by a processor, cause the processor to perform a method, comprising:
    configuring a non-transitory data storage medium to store a virtual aggregate including N nodes, where N is an integer that is >3, each node having a node block size;
    receiving data to be stored among the N nodes;
    parsing the data into M data blocks where M is an integer that is ≥1;
    performing a hashing function on each data block to generate metadata (MD) comprising a hash table that is identical for copies of the MD;
    selecting for each data block a selected node of the N nodes, wherein the selecting comprises:
        mirroring the MD in a metadata field of the selected node,
        mirroring a data payload of the data block in a mirrored data field of the selected node, and
        striping the data payload of the data block in a striped data field of one or more other nodes of the N nodes that are not the selected node; and
    repeating the selecting until the MD and data payloads of all the M data blocks have been mirrored and striped into at least a portion of the N nodes.

28. A system comprising:
    a memory; and
    a processor coupled with the memory to:
        configure a non-transitory data storage medium to store a virtual aggregate including N nodes, where N is an integer that is >3, each node having a node block size;
        receive data to be stored among the N nodes;
        parse the data into M data blocks where M is an integer that is ≥1;

perform a hashing function on each data block to generate metadata (MD) comprising a hash table that is identical for copies of the MD;
select for each data block a selected node of the N nodes, wherein the selection comprises:
  mirror the MD in a metadata field of the selected node,
  mirror a data payload of the data block in a mirrored data field of the selected node, and
  stripe the data payload of the data block in a striped data field of one or more other nodes of the N nodes that are not the selected node; and
repeat the selection until the MD and data payloads of all the M data blocks have been mirrored and striped into at least a portion of the N nodes.

* * * * *